United States Patent [19]

Miller et al.

[11] Patent Number: 5,373,032
[45] Date of Patent: Dec. 13, 1994

[54] RADIATION CURABLE ALK-1-ENYL URETHANYL PREPOLYMERS

[75] Inventors: Mark M. Miller, Ridgewood, N.J.; Jeffrey S. Plotkin, Monsey, N.Y.

[73] Assignee: ISP Investments Inc., Wilmington, Del.

[21] Appl. No.: 108,212

[22] Filed: Aug. 18, 1993

[51] Int. Cl.$^5$ .......................... C08F 2/50; C08F 26/02; C08F 299/06
[52] U.S. Cl. .......................... 522/31; 522/96; 522/97; 522/98; 526/301
[58] Field of Search .......................... 522/96, 97, 98, 31; 526/301

[56] References Cited

U.S. PATENT DOCUMENTS

| | | | |
|---|---|---|---|
| 4,751,273 | 6/1988 | Lapin | 522/97 |
| 5,019,636 | 5/1991 | Lapin | 522/97 |
| 5,139,872 | 8/1992 | Lapin | 522/97 |
| 5,153,237 | 10/1992 | Plotkin | 522/90 |

Primary Examiner—Marion E. McCamish
Assistant Examiner—Arthur H. Koeckert
Attorney, Agent, or Firm—Marilyn J. Maue; Joshua J. Ward

[57] ABSTRACT

This invention relates to alk-1-enyl etherurethanyl block prepolymers which are curable by cationically initiated radiation and which are defined by the formula $$(R_5CH=CHOR_4O-)_2$$
$$-[(CONHANHCOOR_1CHO)_mCONHANHCO]-$$
$$|$$
$$R_2OCH=CHR_3$$

wherein m has a value of from 1 to 25;

A is $C_2$ to $C_{12}$ alkylene, $C_6$ to $C_{14}$ aryl, both groups optionally substituted with lower alkyl, halo lower alkyl, alkyleneoxy, halogen or aryl;

$R_1$ is alkylene containing from 1 to 6 carbon atoms;

$R_2$ is a saturated or unsaturated divalent radical containing from 1 to 14 carbon atoms and is selected from the group of alkylene, alkenylene and arylene, each group optionally substituted with oxygen, halogen, lower alkyl and/or hydroxy;

$R_3$ is hydrogen or $C_1$ to $C_6$ alkyl;

$R_4$ is $C_1$ to $C_6$ alkylene, $C_6$ to $C_{14}$ arylene, lower alkyl substituted phenylene or xylylene and $R_5$ is hydrogen or $C_1$ to $C_4$ alkyl. The invention also relates to the method of preparing and curing the above prepolymer and to the use of the cured prepolymer as a hard, flexible protective coating possessing high density and superior resistance to abrasion and chemical attack.

17 Claims, No Drawings

RADIATION CURABLE ALK-1-ENYL URETHANYL PREPOLYMERS

In one aspect, the present invention relates to novel prepolymers containing polyurethanyl groups and a plurality of alk-1-enyl ether crosslinking sites. In another aspect the invention relates to the preparation of said prepolymers and in still another aspect the invention relates to cured coatings of said prepolymers.

BACKGROUND OF THE INVENTION

It is known that certain urethanyl coating materials can be cured thermally or by radiation in the presence of a free radical photoinitiator but these materials do not lend themselves to cationically induced polymerization. It is well recognized that thermal curing is not cost efficient and that radiation curing in free radical systems is oxygen inhibited, thus requiring an inert atmosphere or the minimizing affect of a hydrogen donating component. The later expedient is not completely satisfactory since such hydrogen donating components significantly reduce the rate of reaction. Also, it has been found that polymerization or curing in free radical systems ceases almost immediately upon removing the source of radiation; thus, the cured product often contains significant amounts of unpolymerized components. Accordingly, it is an aim of research to develop monomers or oligomers which provide stable polymerizable formulations with urethane containing materials while incorporating other beneficial properties in the finished cured product. Additionally, it is desirable that such monomers or their oligomers be amenable to radiation curing at a rapid rate under mild temperature conditions by cationically induced polymerization which is not oxygen inhibited and which permits continued polymerization after removal from the source of radiation exposure.

One such group of compounds is the curable propenyl ether resins of U.S. Pat. No. 5,153,237 which may contain a propenyl ether group indirectly bonded to the internal backbone of the compound. However, a higher degree of flexibility, hardness and cross-link density than these compounds possess is desirable.

Accordingly, it is an object of the present invention to overcome the disadvantages of previous urethanyl prepolymers and to provide a novel urethanyl prepolymer of high vinyl active functionality which is cationically curable at room temperature by radiation.

Another object is to provide a urethanyl prepolymer containing many crosslinking sites directly bonded to a polymer backbone which is rapidly cured to a high density material under mild conditions.

Another object of this invention is to provide a convenient process for the preparation of the present prepolymer.

Still another object of this invention is to provide a protective coating with a cured high density prepolymer having improved hardness, flexibility, resistance to abrasion and chemical attack.

These and other objects will become apparent from the following description and disclosure.

THE INVENTION

In accordance with this invention, a polyhydroxylated alk-1-enyl ether having the formula

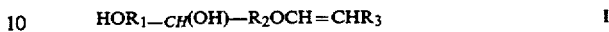

is reacted with an isocyanate having the structure

to form an intermediate monomer or oligomer defined by the formula

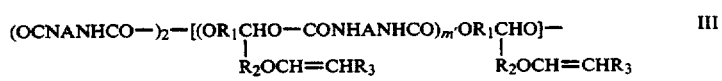

wherein
m' has a value of from 1 to 25;
A is $C_2$ to $C_{12}$ alkylene, $C_6$ to $C_{14}$ aryl, both groups optionally substituted with lower alkyl, halo lower alkyl, alkyleneoxy, halogen or aryl;
$R_1$ is alkylene containing from 1 to 6 carbon atoms;
$R_2$ is a saturated or unsaturated divalent radical containing from 1 to 14 carbon atoms and is selected from the group of alkylene, alkenylene and arylene, each group optionally substituted with oxygen, halogen, lower alkyl and/or hydroxy and $R_3$ is hydrogen or $C_1$ to $C_6$ alkyl.

The polyhydroxylated alk-1-enyl ether reactant (I) may contain an additional OH group in the $R_2$ group which would result in an intermediate monomer or oligomer of more complex structure, i.e. where OC-N—A—NCO reacts with the additional —OH group to provide another

group in the side chain of the intermediate compound to provide a structure:

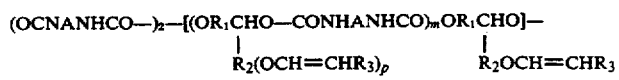

where p has a value of from 2 to 4. However, the preferred hydroxylated alk-1-enyl ether compounds of this invention are dihydroxylated and most preferred are those wherein $R_1$ and $R_2$ are lower alkyl and $R_3$ is hydrogen, methyl or ethyl. Suitable hydroxylated alk-1-enyl ether reactants include:
1,2-dihydroxyethyl ethyl prop-1-enyl ether,
1,2-dihydroxypropyl butyl prop-1-enyl ether,
1,2-dihydroxypropyl ethyl vinyl ether,
1,3-dihydroxybutyl ethyl prop-1-enyl ether,
1,3-dihydroxybutyl octyl vinyl ether,
1,3-dihydroxyhexyl dodecyl but-1-enyl ether,
1,2-dihydroxybutenyl ethyl prop-1-enyl ether,
1,3-dihydroxyoctenyl ethyl vinyl ether,
1,3-dihydroxydecyl hexyl hex-1-enyl ether,
1,2-dihydroxyethyl phenyl vinyl ether, 1,3-dihydroxypropyl bromophenyl vinyl ether,
1,3-dihydroxyethyl chlorophenyl vinyl ether,
1,3-dihydroxyethyl tolyl vinyl ether,
1,3-dihydroxyethyl hydroxyphenyl vinyl ether,
1,3-dihydroxyethyl oxyphenyl vinyl ether,
1,3-dihydroxyethyl dibromohexyl vinyl ether,
1,3-dihydroxyethyl hydroxyoctyl vinyl ether,
1,2-dihydroxybutyl tolyl prop-1-enyl ether and the like.

Suitable examples of diisocyanate reactant II include butylene-1,4-diisocyanate, propylene-1,3-diisocyanate, hexylene-1,6-diisocyanate, 2,4-dimethyl hexylene-1,6-diisocyanate, ethylene-1,2-diisocyanate, 2,2,4-trimethyl hexylene-1,6-diisocyanate, decylene-10-diisocyanate, isomeric phenylene diisocyanates, isomeric naphthylene diisocyanates, isomeric tolylene diisocyanates, isomeric bisphenylene diisocyanates, 2-chloromethyl butylene-1,4-diisocyanate, 3-bromoethyl hexylene-1,6-diisocyanate, 4-chlorobutylene-1,4-diisocyanate, diphenylmethane-1,1-diisocyanate, isophorone diisocyanate, triethylene glycol dipropyl ether diisocyanate, 4-chlorophenyl diisocyanate, 4-chloromethyl phenyl diisocyanate, styrene diisocyanate, 4-methoxyphenyl diisocyanate, 3-ethoxyphenyl diisocyanate, 1,3-dimethylphenyl diisocyanate, etc.

In the reaction of I and II, i.e.

HOR₁—CH(OH)—R₂OCH=CHR₃+OCN—A—NCO to obtain resinous intermediate product III, the mole ratio of the polyhydroxy alk-1-enyl ether to polyisocyanate is dependent on the number of functional —OH and OCN— groups in the respective reactants. Generally, a —OH to OCN— mole ratio of between about 1:1 and about 1:2.5 can be employed, however, a slight excess of reactant II is preferred. Further, this reaction can be carried out in the presence of a base catalyst such as, e.g. dibutyl tin dilaurate, diazabicyclo octane, triethylamine, 1,8-diazabicyclo [5.3.0]undec-7-ene, metal acetylacetonates of manganese, vanadium, iron, cobalt, and chromium and the like, which catalyst is employed in a concentration of between about 0.01 and 0.5 weight %, preferably between about 0.02 and about 0.3 weight %, based on total reactants.

The reaction of I and II is carried out in the liquid phase with agitation under a blanket of an inert gas. A temperature of between about 20° and about 110° C., preferably, between about 40° and about 80° C., for a period of from about 1 to about 5 hours is employed for both reactions. The intermediate monomer or oligomer III is then reacted with an end capping compound, preferably a monohydroxy alk-1-enyl ether of the formula

HO—R₄—OCH=CHR₅   IV wherein R₄ is C₁ to C₆ alkylene, C₆ to C14 arylene, xylylene, each optionally substituted with alkyl, halogen or alkenyl and R₅ is hydrogen or C₁ to C₄ alkyl, to form the monomer or block oligomer of this invention having the formula (R₅CH=ΨHOP₄O—)₂

—[(CONHANHCOOR₁CHO)ₘCONHANHCO]—
|
R₂OCH=CHR₃

Representative monohydroxy alk-1-enyl ethers which end cap the diisocyanate intermediate include 4-hydroxybutyl vinyl ether, 1-hydroxypropyl prop-1-enyl ether, 1-hydroxyhexyl prop-1-enyl ether, 1-hydroxy dimethylenepropylene vinyl ether, hydroxycyclohexylene vinyl ether, the vinyl ether of hydroxymethyl benzyl alcohol; the prop-1-enyl ether of hydroxymethyl benzyl alcohol. 1-hydroxymethyl vinyl ether, 1-hydroxybutyl prop-1-enyl ether, 2-hydroxy hexyl vinyl ether, 4-hydroxyphenyl vinyl ether, 3,4-dimethylphenyl vinyl ether, 2,4-dichlorophenyl but-1-enyl ether, xylyl vinyl ether, mono vinyl ether of 1,4-cyclohexane dimethanol, ethenylphenyl vinyl ether, etc. and mixtures thereof.

In the reaction between intermediate compound III and the end capping monohydroxy alk-1-enyl ether, a mole ratio of -NCO to -OCH=CHR₅ between about 4:1 and about 1:4, preferably between about 1:1.5 and about 1:2 is employed. The Brookfield viscosity of the prepolymeric product, which ranges from about 5,000 to about 500,000 cps, is inversely affected by the amount of end capping diluent added. This reaction is also carried out with constant agitation under a blanket of inert gas at a temperature of from about 20° to about 100° C. for a period of from about 0.5 to about 5 hours to provide the liquid prepolymeric product of this invention.

The above reactions can be effected in a single stage or in a two-stage process. In the single stage, the polyhydroxylated alk-1-enyl ether, the polyisocyanate and the end capping component diluent are contacted with constant agitation under a pressure of from about atmospheric to about 20 psig.

The cationically curable prepolymer of this invention exhibits many advantages over the polyurethanyl prepolymers of the art in that the present prepolymer offers an increased number of crosslinking sites, which, when polymerized, provides a coating of extremely high density having excellent resistance to abrasion and chemical attack. The present prepolymer, obtained in a liquid state, allows for improved uniform coating applications on a substrate of metal, plastic, ceramic, wood, paper, glass, etc. The cured prepolymer also maintains flexibility resulting from their many unsaturated sites where polymer units are extended by addition to double bonds. Further, coatings of the present cured polymer preserve the finish of a painted surface, e.g. as automotive, aircraft and ship coatings. The present prepolymers III are prepared for curing by the addition of a cationic initiator and between about 10 and about 80 wt. % of a diluent. Suitable diluents used in coating formulations include the divinyl ether of triethylene glycol (DVE-3) and cyclohexane dimethanol divinyl ether (CHVE), the propenyl ether of propylene carbonate (PEPC), tetrahydrofurfuryl vinyl ether and epoxides, e.g. 3,4-epoxycyclohexyl-3,4-epoxycyclohexane.

The present prepolymers which are useful as curable, high density molding resins and highly solvent resistant adhesive coatings, can be applied to a surface in a thickness of between about 0.1 to about 5 mils and cured by exposure to a source of radiation such as UV light, electron beam, laser emission, X-rays, gamma-rays, etc. in the presence of an onium photoinitiator such as, for example a diaryl iodonium salt, a polyphenyl sulphonium fluoride, a triaryl sulphonium salt and the like. Curing by UV light exposure is generally effected at between about 300 and about 3,000 milli joules/cm². Radiation curing of the prepolymer is extremely rapid, so that a coated substrate can be processed at a rate of up to 700 feet/sec and; whereas curing by heat requires a longer treatment up to about 2 hours. The present coatings are clear, colorless, flexible films which find many applications as indicated above.

The reaction was monitored by volumetric isocyanate analysis, and proceeded to completion after 4 hours. The viscous product,

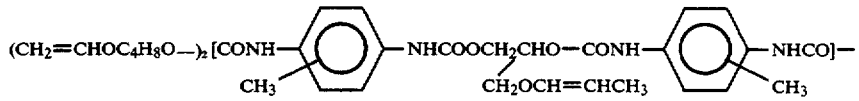

Having thus generally described the invention, reference is now had to the accompanying examples which illustrate comparative examples and preferred embodiments which are not construed as limiting to the scope of the invention as more broadly set forth above and in the appended claims.

EXAMPLE 1

Preparation of Dihydroxy Alk-1-Enyl Ether

Into a 1500 cc stainless steel reaction vessel, equipped with a mechanical stirrer, high pressure gas feed lines, internal cooling, and temperature control, was added 1140.6 grams (10 moles) of propenyl glycidyl ether (PGE), 198.0 grams (11 moles) of water, 5.7 grams of tetrabutyl ammonium bromide, and 3.0 grams of sodium bicarbonate. The mixture was heated to 100° C. under a $CO_2$ pressure of 200 psig for 6 hours, with continuous $CO_2$ feed. Analysis by gas chromatography showed quantitative conversion of PGE. This material was then flash distilled at a temperature of 120° C. at 5.0 mm Hg, to remove water and separate the product from the catalyst. 1-Propenyloxy-2,3-propanediol 1250 grams of 98.5% purity was recovered, and its structure was confirmed by FTIR and $H^1NMR$ spectroscopic methods.

EXAMPLE 2

Preparation of Uncured Prepolymer

Into a 250 cc round bottom flask equipped with agitation, reflux condenser, nitrogen sparge, and temperature control was added 87.08 grams (0.5 moles) of toluene diisocyanate. To this was added 87.08 grams (0.75 moles) of 4-hydroxybutyl vinyl ether, 16.53 grams (0,125 moles) of 1-propenyloxy propanediol from Example 1 and 0.2 grams of dibutyl tin dilaurate at a controlled rate so as to maintain a temperature of 60°-80° C.

was recovered, and the above structure was confirmed by $H^1NMR$ and FTIR spectroscopy.

EXAMPLE 3

Prepolymer Preparation

Into a 250 cc round bottom flask equipped with agitation, reflux condenser, nitrogen sparge, and temperature control was added 87.98 g (0.5 moles) of toluene diisocyanate. To this was added 58.05 grams (0.50 moles) of 4-hydroxybutyl vinyl ether 33.05 grams (0.25 moles) of 1-propenyloxy propanediol from Example 1 and 0.2 grams of dibutyl tin dilaurate at a controlled rate so as to maintain a temperature of 60°-80° C. The reaction was monitored by volumetric isocyanate analysis, and proceeded to completion after 4 hours. The same viscous product as obtained in Example 2 was recovered, and the structure was confirmed by $H^1NMR$ and FTIR spectroscopy

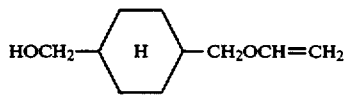

When

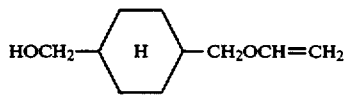

is substituted in the same molar amount in the above Example 3 for 4-hydroxybutyl vinyl ether, the product has the structure

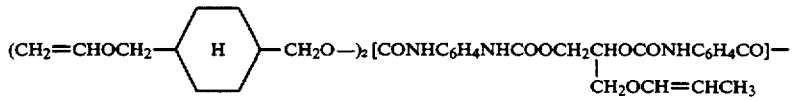

When $OCN(CH_2)_6CNO$ is substituted in the same molar amount in the above Example 3 for toluene diisocyanate, the product has the structure

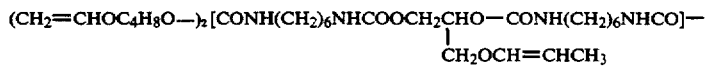

When $OCN—C_6H_4—CH_2—C_6H_4—NCO$ is substituted in the same molar amount in the above Example 3 for toluene diisocyanate, the product has the structure

EXAMPLE 4

The procedure of Example 2 was repeated using 7.8 grams of 1,2-propanediol in place of 1-propenyloxy propanediol. The product of this example was identified as having the formula The coating performance of each of these formulations was compared and the results summarized in the following Table.

TABLE

| OLIGOMER | PENCIL HARDNESS | ADHESION % | MANDRELL BEND | MEK RUBS | TENSILE PROPERTIES | | |
|---|---|---|---|---|---|---|---|
| | | | | | YOUNGS MODULUS | TENSILE STRENGTH | ELONGATION % |
| EXAMPLE 2 | 2H | 100 |  | >200 | 89 | 1250 | 7.6 |
| EXAMPLE 3 | 3H | 70 |  | >200 | 76 | 1150 | 8.4 |
| EXAMPLE 4 | H | 70 |  | >200 | 65 | 1000 | 5.1 |
| EXAMPLE 5 | H | 50 |  | >200 | 55 | 800 | 4.8 |
| EXAMPLE 6 | B | 0 |  | >200 | 10 | 600 | 8.5 |

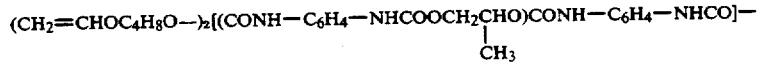

and is useful as a non-reactive chain extender resin.

EXAMPLE 5

The procedure of Example 3 was repeated using 15.5 grams of 1,2-propanediol in place of 1-propenyloxy propanediol. The product of this example is identical to that obtained in Example 4

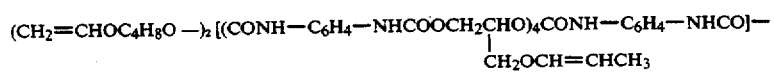

COMPARATIVE EXAMPLE 6

The procedure of Example 3 was repeated using 37.06 grams of n-butanol in place of hydroxybutyl vinyl ether. The product of this example

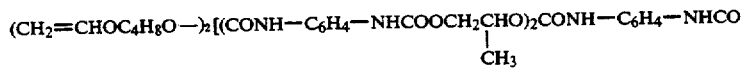

possesses a non-reactive end-capping group but would retain internal cross-linking properties because of the reactive-chain extender. However, this product exhibits poor pencil hardness, little or no adhesive properties and low tensile properties.

EXAMPLE 7

The products of Examples 2–6 were tested as radiation curable formulations containing 49% of the respective products, 49% of divinyl ether of triethylene glycol and 2% of triphenyl sulfonium salt initiator (FX-512). The resulting formulations were each coated on an aluminum panel and subjected to curing using a 400 mJ/cm2 PPG model QC-1202A/N U.V. processor.

EXAMPLE 8

Example 2 is repeated, except that 3 moles of 4-hydroxybutyl vinyl ether, 2 moles of toluene diisocyanate and 0.8 grams of dibutyl tin dilaurate are substituted for the amounts shown therein (a 4-fold excess). The product of this reaction has the formula

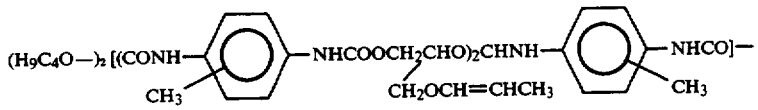

Merely by increasing the mole ratio of the intermediate with respect to the end capping hydroxy alk-1-enyl ether, a product where m has a value greater than can be obtained. Accordingly, a 25-fold increase in the intermediate concentration produces a product where m is 25.

What is claimed is:

1. A polyalk-1-enyl/urethanyl prepolymer having the formula

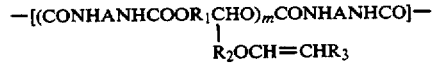

wherein m has a value of from 1 to 25;

A is $C_2$ to $C_{12}$ alkylene, $C_6$ to $C_{14}$ arylene, both groups optionally substituted with lower alkyl, halo lower alkyl, alkyleneoxy, halogen or aryl;

$R_1$ is alkylene containing from 1 to 6 carbon atoms;

$R_2$ is a saturated or unsaturated divalent radical containing from 1 to 14 carbon atoms and is selected from the group of alkylene, alkenylene and arylene, each group optionally substituted with oxygen, halogen, lower alkyl and/or hydroxy;

$R_3$ is hydrogen or $C_1$ to $C_6$ alkyl;

$R_4$ is $C_1$ to $C_6$ alkylene, $C_6$ to $C_{14}$ arylene, lower alkyl substituted phenylene or xylylene and $R_5$ hydrogen or $C_1$ to $C_4$ alkyl.

2. The prepolymer of claim 1 wherein m has a value of from 1 to 4, A is alkylene, $R_3$ is lower alkyl, $R_4$ is alkylene, and $R_5$ is hydrogen or methyl.

3. The prepolymer of claim 1 wherein m has a value of from 1 to 4, A is arylene, $R_3$ is lower alkyl, $R_4$ is alkylene, and $R_5$ is hydrogen or methyl.

4. The prepolymer of claim 1 having the formula

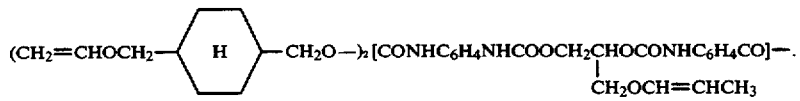

5. The prepolymer of claim 1 having the formula

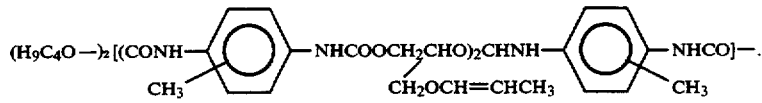

6. The prepolymer of claim 1 having the formula

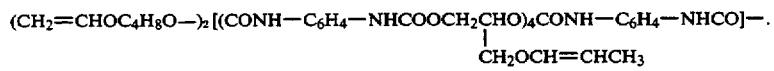

7. The prepolymer of claim 1 having the formula

8. A radiation curable composition containing the prepolymer of claim 1 and an effective polymerizing amount of a cationic polymerization initiator.

9. The composition of claim 8 wherein said initiator is an onium salt.

10. The composition of claim 9 wherein the initiator is diphenyl-4-thiophenoxy phenyl sulfonium salt.

11. The composition of claim 8 containing the prepolymer wherein m has a value of 2, A is arylene, $R_3$ is lower alkyl, $R_4$ is alkylene, and $R_5$ is hydrogen or methyl.

12. The composition of claim 8 additionally containing a diluent having the formula

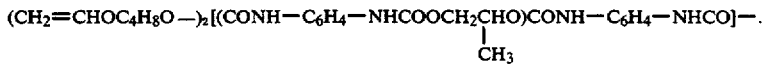

13. The composition of claim 8 wherein the prepolymer has the formula

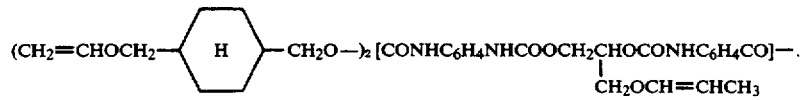

14. The composition of claim 8 wherein the prepolymer has the formula

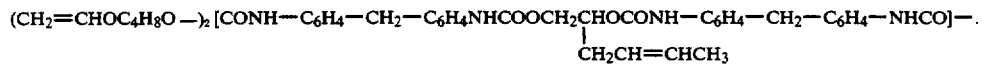

15. The composition of claim 8 wherein the prepolymer has the formula

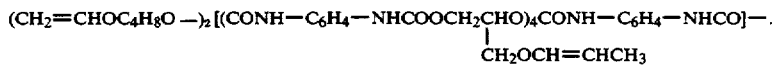

16. The composition of claim 8 wherein the prepolymer has the formula

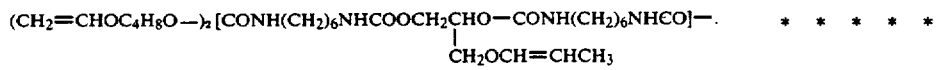
17. A substrate having a hard, durable and flexible coating of the cured prepolymer of claim 1.
* * * * *